April 26, 1966
J. D. LINCOLN
3,248,275
RESIN IMPREGNATED FIBER HONEYCOMB PRODUCT
Original Filed May 15, 1959
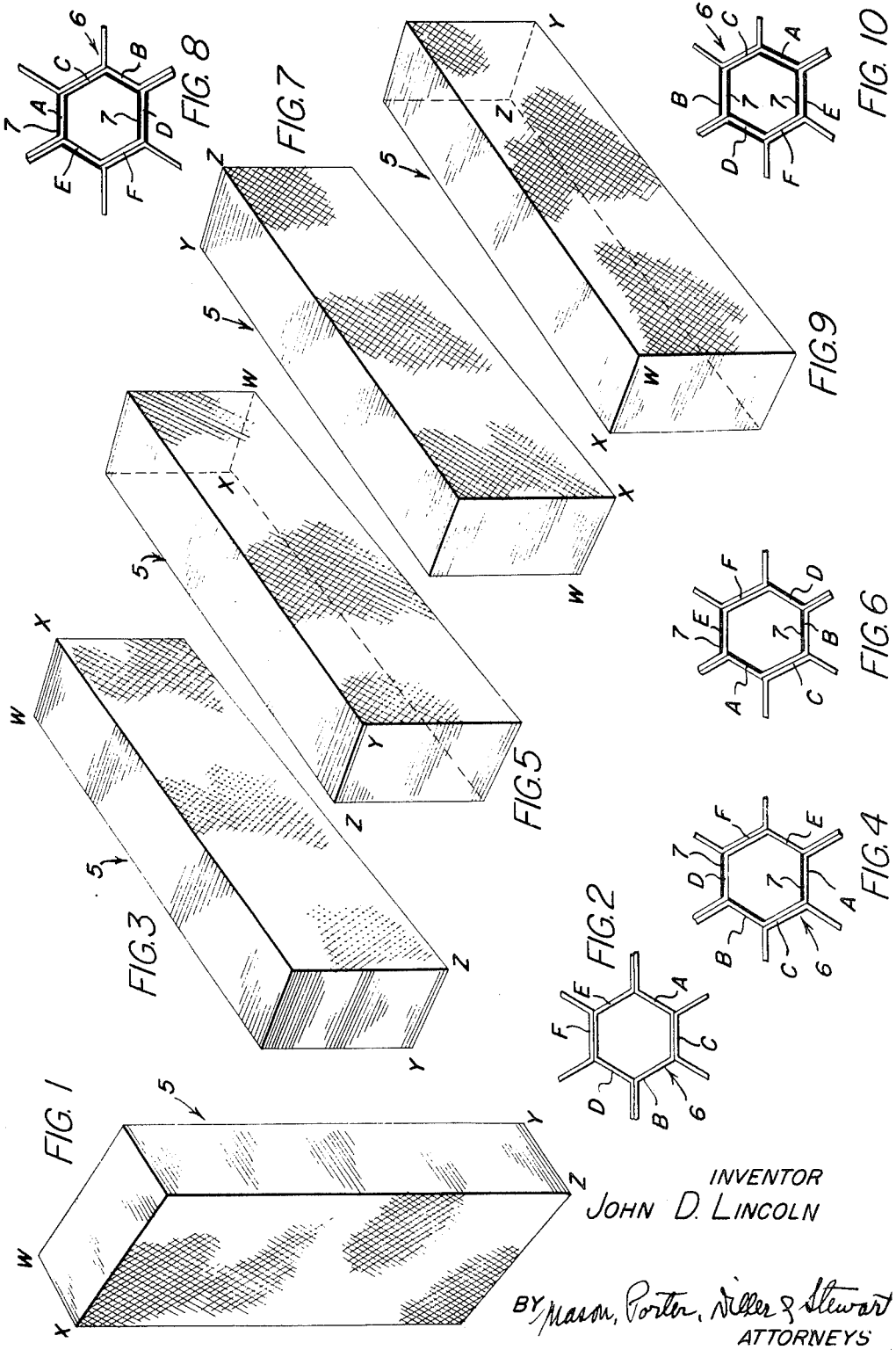
INVENTOR
JOHN D. LINCOLN
BY Mason, Porter, Diller & Stewart
ATTORNEYS

United States Patent Office 3,248,275
Patented Apr. 26, 1966

3,248,275
RESIN IMPREGNATED FIBER HONEYCOMB
PRODUCT
John D. Lincoln, Mount Vernon, Ohio, assignor to Continental Can Company, New York, N.Y., a corporation of New York
Original application May 15, 1959, Ser. No. 813,513, now Patent No. 3,098,759, dated July 23, 1963. Divided and this application July 30, 1962, Ser. No. 213,502
6 Claims. (Cl. 161—68)

The invention relates in general to the art of manufacturing honeycomb, and more particularly seeks to provide a novel honeycomb material having a high strength to weight ratio.

This application is a division of my copending application Serial No. 813,513, entitled Method for Curing Honeycomb, filed May 15, 1959, now U.S. Patent No. 3,098,759.

Honeycomb is conventionally formed in blocks and it is then expanded to form a honeycomb log. For certain requirements the honeycomb log is formed of a glass fiber material and is impregnated or coated with a resin or other plastic. The reinforcing of the honeycomb log is accomplished by repeatedly dipping the honeycomb log into a desired coating material and curing the coated honeycomb log. However, the structure of the honeycomb log is such that each cell has a plurality of single thickness walls and at least a pair of double thickness walls. When the honeycomb log is coated and cured in the conventional manner, an equal amount of coating material is applied to both the single thickness walls and the double thickness walls. Since the double thickness walls do not require nearly as much reinforcing by the coating, the application of this additional coating to the double thickness walls results in a waste of material and an excess weight in the honeycomb log. Since such as honeycomb log is used for aircraft construction, where weight is a critical factor, it is highly desirable to place the coating primarily on the single thickness walls so that the single thickness walls will have substantially the same strength as the double thickness walls.

In view of the foregoing, it is the primary object of the invention to provide a novel honeycomb material of the cellular type wherein the single thickness walls of each cell of the honeycomb material are reinforced to have a compressive strength which closely approaches the compressive strength of the double thickness walls of the cells.

A further object of the invention is to provide a novel honeycomb material of the type wherein the walls of the honeycomb cells are reinforced by a coating of material, such as resin, the coating of material applied to each of the single thickness walls of a cell being of a greater thickness than the thickness of the coating of material applied to the double thickness walls of the same cells, whereby the single thickness walls have substantially the same compressive strength as the double thickness walls and the honeycomb material has a maximum strength-weight ratio.

With the above and other objects in view that will hereinafter appear, the nature of the invention will be more clearly understood by reference to the following detailed description, appended claims, and the several illustrated views in the accompanying drawings.

In the drawings:
FIGURE 1 is a perspective view of the untreated honeycomb log disposed in an upstanding position.
FIGURE 2 is an enlarged fragmentary elevational view showing the specific details of the cell arrangement.
FIGURE 3 is a perspective view of the honeycomb log in an initial curing position.
FIGURE 4 is an enlarged fragmentary elevational view showing the cells after the initial curing.
FIGURE 5 is a perspective view showing the honeycomb log in a second curing position.
FIGURE 6 is an enlarged fragmentary elevational view showing the cells after the second curing.
FIGURE 7 is a perspective view showing the honeycomb log in a third curing position.
FIGURE 8 is an enlarged fragmentary elevational view showing the cells after the third curing.
FIGURE 9 is a perspective view showing the honeycomb log in a fourth curing position.
FIGURE 10 is an enlarged fragmentary elevational view showing the cells after the fourth curing.

A conventional type of honeycomb log 5 is illustrated in FIGURE 1. The honeycomb log 5 may be formed in any conventional manner for the purpose of the invention. However, it is preferred that the honeycomb log be formed of phenolic resin inpregnated glass cloth.

The honey comb log 5 includes a plurality of substantially identical cells 6. Each of the cells is defined by four single thickness walls and two double thickness walls. When the honeycomb log is standing in the position illustrated in FIGURES 1 and 2, the lowermost wall of each cell is a double thickness wall and is referred to by the letter C. A single thickness wall A extends upwardly and to the right from the double thickness wall C. A second single thickness wall B extends upwardly and to the left from the double thickness wall C. A third single thickness wall D extends upwardly and to the right from the upper edge of the single thickness wall B. A fourth single thickness wall E extends upwardly and to the left from the upper edge from the single thickness wall A. A second double thickness wall F extends between the upper edges of the single thickness walls D and E.

In order to disclose accurately the orientation of the honeycomb log 5 during the curing process, the lower edge of the honeycomb log is defined by the reference line Z–Y, this edge being disposed parallel to the axes of the cells 6. A second reference line X–W is disposed along the upper edge of the honeycomb log 5 remote from the reference line Z–Y.

The strength of the honeycomb log 5 is increased by dipping it into liquid coating material, after which it is cured, the coating material increasing the thickness and strength of each wall of each of the cells 6. This coating material will vary depending upon the particular requirements of the honeycomb material. Coating materials such as phenolformaldehyde, resins and polyester, are typical coating materials.

In the process of reinforcing the walls of the cells 6 of the honeycomb log 5, the honeycomb log is dipped into the desired coating material, after which a major portion of the excess coating material is drained from the honeycomb log. The honeycomb log 5 is then positioned for draining in the position illustrated in FIGURE 3. When in this position, the line Y–Z is disposed lowermost and the honeycomb log slopes upwardly with the reference line W–X being disposed uppermost. As is shown in FIGURE 4, the cell walls A are disposed lowermost and are generally horizontal. With the honeycomb log 5 in this position, the coating material, referred to by the numeral 7, will have a tendency to run down onto uppermost surfaces of each of the cell walls A and thus a maximum amount of coating material is applied to those cell walls. The coating material is permitted to cure with the honeycomb log in the position walls A are disposed lowermost and are generally horizontal. With the honeycomb log 5 in this position, the coating material, referred to by the numeral 7, will have a tendency to run down onto uppermost surfaces of each of the cell walls A and thus a maximum amount of coating material is applied to those cell walls. The coating material is permitted to cure with the honeycomb log in the position illustrated in FIGURE 3, the curing normally taking place in an oven.

After the coating material 7, which has been applied to the cell walls A, has been cured, the honeycomb log 5 is again dipped in the coating material. The excess coating material is again drained from the honeycomb log and the honeycomb log is rested in the position illustrated in FIGURE 5. It is to be noted that the rest position of the honeycomb log in FIGURE 5 is rotated from the rest position of FIGURE 2, 180° about an axis extending normal to the axes of the cells. When the honeycomb log is disposed in the position illustrated in FIGURE 5, the cell walls B are disposed lowermost and generally horizontal, as is illustrated in FIGURE 6. Thus when the honeycomb log 5 is in the position illustrated in FIGURE 5, the coating material 7 has a tendency to run down onto the upper surfaces of the cell walls B so that the coating material is primarily deposited on the cell walls B. This last deposited coating material 7 is then cured.

The honeycomb log is dipped in the coating material for a fourth time and the excess coating material is permitted to drain. The honeycomb log 5 is then positioned as is shown in FIGURE 9. The honeycomb log in its position of FIGURE 9 has been rotated about the longitudinal axis normal to the axes of the cells 6 180° from the position of FIGURE 7. When the honeycomb log 5 is in the position illustrated in FIGURE 9, the cell walls E are disposed lowermost and generally horizontal so that the coating material 7 will drain down onto the upper surfaces of the cell walls E. This coating material is then cured. When this fourth curing operation has been completed, it will be seen that an equal amount of coating material 7 has been applied to each of the single thickness cell walls A, B, D and E, while a minimum amount of coating material has been applied to the cell walls C and F. Thus the compressive strength of the single thickness cell walls has been greatly increased and the compressive strength of the double thickness cell walls has been increased a much lesser amount.

The above described cycle of coating the single thickness walls of the honeycomb log may be repeated as many times as is required to obtain the desired strength of honeycomb material. Normally, however, the thickness of each of the single thickness cell walls will not be increased so as to be greater than the thickness of correspondent double thickness walls.

From the foregoing, it will be readily apparent that by carrying out four separate and independent dipping and curing operations, in the manner described, a much greater amount of coating material may be applied to the single thickness walls of the cells of a honeycomb log than that applied to the double thickness walls of the same cells. It will also be readily apparent that a like thickness of coating material will be applied to each of the single thickness walls. A suitable apparatus for carrying out the afore-mentioned curing operations may be found in my copending application Serial No. 813,513.

In the normal procedure of coating a honeycomb log, the cycle of dipping and curing the honeycomb log will be repeated at least once and in some instances, many times, until the desired weight of honeycomb log is obtained. In all instances the optimum result will be obtained by providing a honeycomb log wherein a minimum amount of coating material has been applied to the double thickness walls and the single thickness walls have had applied thereto a sufficient amount of coating material so that the single thickness walls are reinforced to have substantially the same strength as the double thickness walls. By so reinforcing the honeycomb log base material, the final honeycomb log will have a maximum strength-weight ratio. This, of course, is highly desirable for use in aircraft construction where the weight of the material used is critical. Furthermore, by not applying an excess amount of coating material to the double thickness walls, there will be a saving of the coating material.

Although the cellular honeycomb illustrated and described is of the hexagonal cell type, it is to be noted that the invention may apply equally as well to honeycomb material having other cells of other cross sections.

It is to be understood that the honeycomb material may be coated utilizing various forms of apparatus and in various modified combinations within the spirit and scope of the invention as defined in the appended claims.

I claim:

1. A cellular honeycomb material including a plurality of individual cells, each of said cells having double thickness and single thickness walls, each of said walls having a reinforcing coating, the reinforcing coating of each single thickness wall being thicker than the reinforcing coating of each double thickness wall, and all of said coated walls having substantially the same compressive strength.

2. A cellular honeycomb material including a plurality of individual cells, each of said cells having double thickness and single thickness walls, each of said walls having a reinforcing coating, the reinforcing coating of each single thickness wall being thicker than the reinforcing coating of each double thickness wall, all of said coated walls having substantially the same compressive strength, and the total thickness of each single thickness wall being no greater than the total thickness of each double thickness wall.

3. A cellular honeycomb material including a plurality of individual cells, each of said cells having two double thickness walls and four single thickness walls, each of said walls being formed of a base material having a reinforcing coating, the reinforcing coating of said single thickness walls being thicker than the reinforcing coating of said double thickness walls.

4. A cellular honeycomb material including a plurality of individual cells, each of said cells having two double thickness walls and four single thickness walls, each of said walls being formed of a base material having a reinforcing coating, the reinforcing coating of said single thickness walls being thicker than the reinforcing coating of said double thickness walls, said double thickness walls and said single thickness walls having substantially the same compressive strength.

5. A cellular honeycomb material including a plurality of individual cells, each of said cells having two double thickness walls and four single thickness walls, each of said walls being formed of a base material having a reinforcing coating, the reinforcing coating of said single thickness walls being thicker than the reinforcing coating of said double thickness walls, the total thickness of each of said single thickness walls being no greater than the total thickness of each of said double thickness walls.

6. A cellular honeycomb material including a plurality of individual cells each of said cells having two double thickness walls and four single thickness walls, each of said walls being formed of a base material having a reinforcing coating, the reinforcing coating of said single thickness walls being thicker than the reinforcing coating of said double thickness walls, said double thickness walls and said single thickness walls having substantially the same compressive strength, the total thickness of each of said single thickness walls being no greater than the total thickness of each of said double thickness walls.

References Cited by the Examiner

UNITED STATES PATENTS

| | | |
|---|---|---|
| 2,477,852 | 8/1949 | Bacon. |
| 2,608,502 | 8/1952 | Merriman _____ 161—68 |
| 2,697,231 | 12/1954 | Strand. |
| 2,910,396 | 10/1959 | Randall et al. |
| 2,977,265 | 3/1961 | Forsberg et al. |

ALEXANDER WYMAN, *Primary Examiner.*

MORRIS SUSSMAN, EARL M. BERGERT, *Examiners.*